United States Patent [19]

Baumberger

[11] 4,404,168
[45] Sep. 13, 1983

[54] APPARATUS FOR THE DISCONTINUOUS PRODUCTION OF ARTICLES FROM FOAMED PLASTICS

[75] Inventor: Beat Baumberger, St. Gallen, Switzerland

[73] Assignee: Mirabed AG, Zug, Switzerland

[21] Appl. No.: 295,562

[22] Filed: Aug. 24, 1981

[30] Foreign Application Priority Data

Sep. 26, 1980 [CH] Switzerland ............... 7246/80

[51] Int. Cl.³ .................. B01F 15/02; B01J 4/02; B01J 13/00
[52] U.S. Cl. ............................ 422/119; 366/138; 366/150; 366/177; 366/181; 366/185; 422/133; 425/188; 425/200
[58] Field of Search ............... 252/359 D, 359 E; 422/119, 133, 135; 366/138, 150, 168, 173, 177, 181, 185; 425/130, 200, 188, 817 R; 264/39, 54

[56] References Cited

U.S. PATENT DOCUMENTS

| | | | |
|---|---|---|---|
| 3,227,424 | 1/1966 | Cunningham | 422/133 |
| 3,312,374 | 4/1967 | Whitlock | 366/181 |
| 3,753,554 | 8/1973 | Muller et al. | 422/133 |
| 3,771,770 | 11/1973 | Lehmann | 422/133 |
| 4,005,981 | 2/1977 | Manceau | 425/188 |
| 4,218,203 | 8/1980 | Tilgner | 425/817 R |
| 4,260,355 | 4/1981 | Rohrig et al. | 422/133 |
| 4,314,963 | 2/1982 | Boden et al. | 425/817 R |

Primary Examiner—Bradley Garris
Attorney, Agent, or Firm—Kinzer, Plyer, Dorn & McEachran

[57] ABSTRACT

Apparatus for the discontinuous production of articles from a foamed plastic, including metering vessels for reaction components arranged above a mixing vessel. The metering vessels are with the interposition of communication bellows connected to the mixing vessel. Inside the cover of the mixing vessel exists an annular space communicating with an annular slot which opens towards the internal wall of the mixing vessel, so that when filling the mixing vessel first one of the reaction components is introduced into the annular space, flowing along the inner wall of the mixing vessel downwardly through the annular slot and in this way flushes off any residue.

7 Claims, 4 Drawing Figures

APPARATUS FOR THE DISCONTINUOUS PRODUCTION OF ARTICLES FROM FOAMED PLASTICS

The present invention has as subject matter apparatus (installation) for the discontinuous production of articles from foamed plastics, which apparatus has a rack and at least two metering (charging) containers for the basic ingredients (reactants), whereby said charging containers are placed above a mixing container and are connected thereto by outlet openings which can be closed.

Such apparatus has become disclosed already in the printed West German Patent Application DE-AS No. 20 22 147. The two liquid reactants, e.g. isocyanate and polyol, are successively, due to an opening of the two charging containers, introduced into the mixing container; the polyol is introduced first so that the mixing chamber (container) becomes rinsed by it, and thereafter the isocyanate is introduced as rapidly as possible. The components next become intensively mixed under use of an agitator, and thereafter the contents of the mixing container are emptied into a mold which had been placed therebeneath.

The known apparatus is beset with a number of flaws. Once the mixing container is emptied residues remain stuck at its wall, so that this container has to become cleansed quite frequently. It furthermore is a disadvantage that due to the open construction the known apparatus can become soiled rather thoroughly. It also does not satisfy certain health regulations concerning the maximum conconcentration of toxic vapors to which a worker can become exposed at his place of work.

It is therefore the goal to be reached by the present invention to create an installation (apparatus) of the type outlined above at which the setbacks mentioned are overcome. This indeed is accomplished according to the present invention in that the mixing vessel or container, which may be tilted, makes tight contact with the edge of a container lid which is tightly secured at the rack, this lid having an annular space with a lower, annular slot which opens towards the internal wall of the mixing container, and that the outlet opening of one of the metering containers leads to the annular space.

Next shall be described in detail one typical embodiment, whereby reference shall be made to the attached sheets of drawings.

Figure 1:
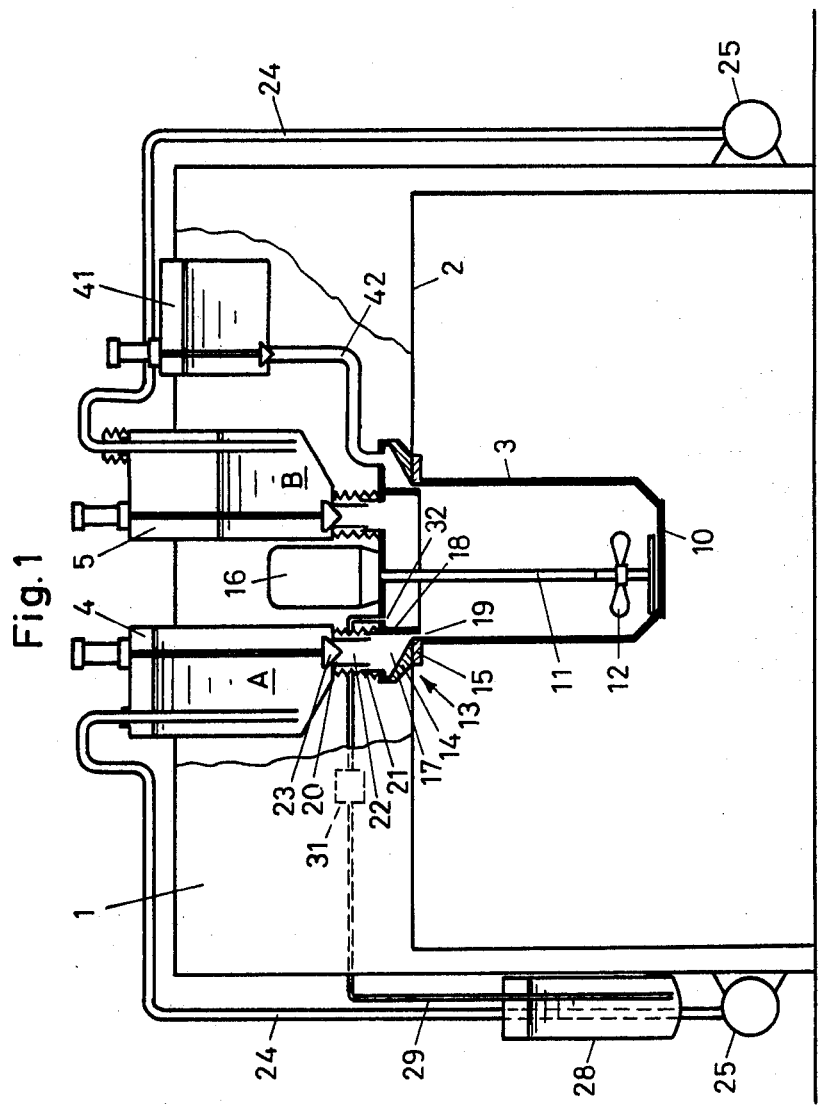
FIG. 1 is the frontal view of the installation, partially sectioned.

The apparatus shown in the drawing for the discontinuous production of articles from foam plastics has a bridge-shaped rack 1 with a horizontal main plate 2. Underneath the main plate 2 the mixing container 3 is located, and above the main plate (platform) are located the two metering or charging containers 4,5, respectively containing reactants A and B. It is, of course, also possible to provide a greater number of dosing (charging) containers should this become required for the production process. For the production of a polyurethane foam the two basic ingredients A and B are, respectively, a polyol and an isocyanate.

Figure 2:
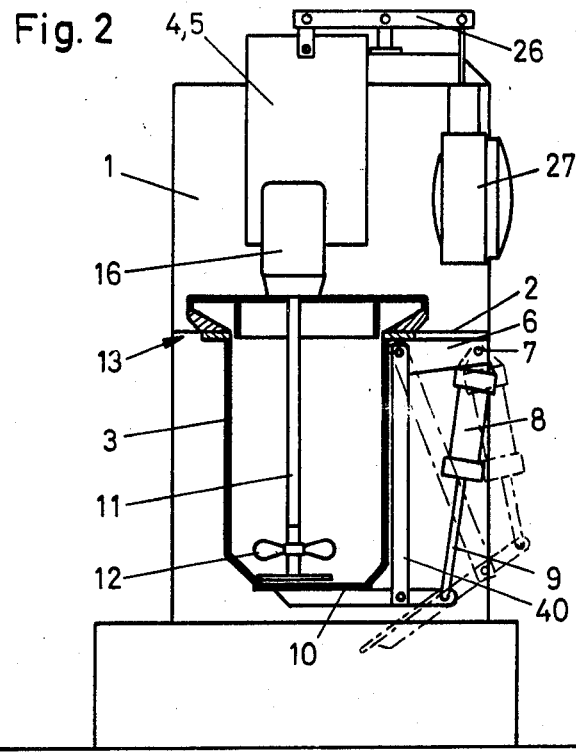
FIG. 2 is a lateral view of the installation according to FIG. 1.
Figure 3:
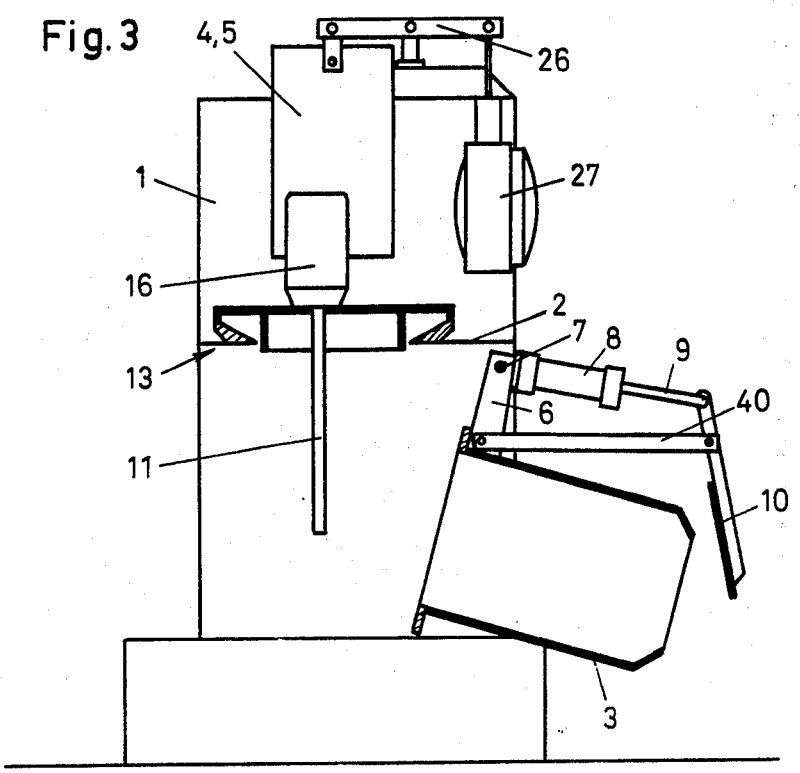
FIG. 3 is a lateral view of the installation according to FIG. 1, where the mixing container has been swung out.

The mixing container 3 is with the interposition of a lateral supporting arm 6 connected tiltably to the main platform 2 and at the fulcrum 7, FIG. 2, is located a pneumatic cylinder 8, the piston 9 of which serves for the actuation of a bottom closure 10. As the mixing container 3 has been constructed this way in a manner that it may become tilted downwardly its cleansing is simple and does not pose any problems.

An agitator 11, disposed within the mixing container 3, is equipped with paddles, bringing about a good mixing of the components A and B. The drive of the agitator occurs under the action of an electromotor 16.

The cover 13 of the mixing container 3 is rigidly and reliably assembled at the main platform 2 and is equipped with a lower sealing edge 14 which makes close contact with the flange 15 of the mixing container 3.

Inside the cover is found an annular space 17 limited by the sleeve-shaped internal wall 18. Below the annular space 17 is an annular slot 19 which opens towards the internal wall of the mixing container 3.

The two containers 4,5 are equipped with lower outlet openings 20 which with the interposition of communication bellows 21 are connected to the inlet nipples 22 in the cover 13. The inlet nipple 22 for the component B runs out directly into the mixing container 3, whereas the inlet nipple for the other component A discharges into the annular space 17. The two outlet openings 20 are closable by shutoff valves 23.

When filling the mixing container 3 component A is first allowed to flow into the annular space 17. The annular slot 19 is of such dimension that the annular space 17 will become filled completely with the liquid component A so that the polyol (component A) may flow downward around the full periphery of the internal wall of the mixing container 3. The polyol thus becomes mixed with any residues which cling to the container wall and flushes them downwardly or at least changes the concentration thereof so that they will not participate in any reaction. This means that during each production step the internal container wall is automatically cleansed. Only after such cleansing has occurred one adds the second basic ingredient B directly into the mixing container 3.

The two containers 4 and 5 may be filled in a manner known, as by use of lateral conduits 24, and two delivery pumps 25 which feed the components from storage containers. The pump for the isocyanate preferably is a membrane pump as this one suffers few disturbances of its operation due to soiling.

The filling of the containers 4,5 with the required amounts of components occurs automatically brought about by a control. The containers 4,5 are suspended from the ends of scale beams 26, FIG. 2, which are connected to switching scales 27. As soon as the required amounts of weight are reached to which the scales are set the delivery pumps are switched off automatically. Instead of a switching scale one may provide also electronic load cells which e.g. operate according to the principle of wire strain gauges.

Due to the placing of the scales the two dosing containers 4,5 are subjected to small, vertical motions, compensated by the communication bellows 21.

For the cleansing of the annular space 17 and of the mixing container 3 at the end of the production there is provided a water vessel 41 the closable outlet conduit 42 of which runs out into the annular space 17.

Figure 4:
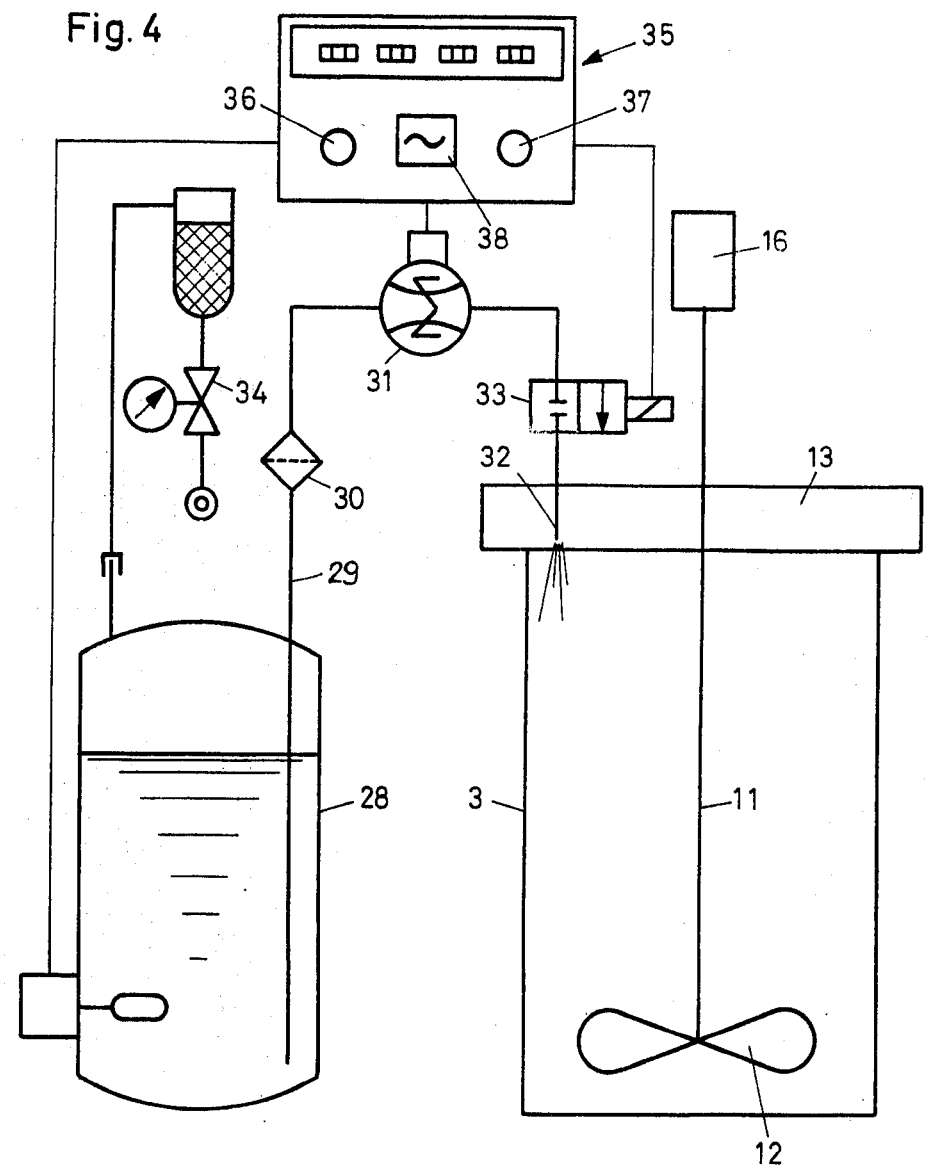
FIG. 4 shows schematically how the catalyst is metered and the control instrument for the installation.

The installation furthermore is equipped with a device for the additional mixing of an additive which e.g. could be a catalyst or a dye contained in a vessel 28 which is mounted at the lateral wall of the rack 1. The additive may be fed to the mixing vessel by a conduit 29, which contains filters 30, FIG. 4, and a counter or meter 31. An injection nozzle 32, which is under the control of a magnetic valve 33, opens into the space of the mixing vessel. A pressure reduction valve 34 regulates the internal pressure of the pressure vessel 28 and a control 35 may be used to adjust the amount of the additional component. The control is equipped with gauges 36,37 where one may read, respectively, the pressure within vessel 28 and the rate of flow of the additional component. The time of mixing may be set manually at a switch 38. Furthermore it is possible to similarly set the ratios of the amounts of components (A and B) and other values and to control and supervise them. The counter 31 preferably is an electronic driven slide counter.

The installation described is a great improvement over the older one disclosed in the printed West German Patent Application No. 2022147. As the mixing vessel 3 makes a tight contact with the upper container cover and because there is a leakproof connection to the charging vessels due to the presence of the communication bellows no vapors may escape which impair the worker's health, so that the specifications for concentrations of noxious gases at the place of work may be satisfied.

The production process for the articles of foam plastics runs fully automatically. First one opens the shutoff valve for the component A (polyol). The polyol is used fo flush out the annular space 17 and the internal wall of the mixing vessel 3 whereby one lets run the agitator 12. Next the agitator is stopped and the shutoff valve is opened for the component B (isocyanate). The isocyanate flows as one large mass into the mixing vessel 3, and the agitator is started again, so that the components A,B become intensively mixed.

If one employs an additional component supplied from vessel 28 then this component, after one has flushed out the mixing vessel with the polyol, is introduced and by use of the agitator is mixed with the polyol before the isocyanate is introduced. The supplying and dosing of the additional component occurs automatically under the action of the control 35.

After the mixing time has been preselected and set at the control the bottom of the container is tilted downwardly under pneumatic action (FIG. 2) so tht the mixture may fill a mold (not shown) where the reaction and the foaming take place. In order to bring about a large opening angle of the bottom the actuation piston 9 of the pneumatic cylinder 8 by an articulated lever 40 is connected with the bottom 10 of the vessel 3, whereby the articulated lever acts like a lever transmission.

I claim:

1. Apparatus for the discontinuous production of articles from a foamed plastic, having a mixing vessel and at least two metering vessels for the basic ingredients, which metering vessels are located above said mixing vessel, and characterized in that the mixing is supported for tilting movement to discharge its contents, a lid for the mixing vessel, said lid being provided with an annular space (17) communicating with a lower annular slot (19) which opens towards the inner wall of the mixing vessel, and one of the metering vessels (4,5) having an outlet opening (20) which discharges an ingredient into the annular space through said annular slot and onto the inner wall of said mixing vessel.

2. Apparatus as claimed in claim 1 further characterized in that the annular slot (19) is limited internally by a sleeve (18) which protrudes downwardly.

3. Apparatus as claimed in claim 1 or 2 further characterized in that the lid has an inlet opening (22) connected by a bellows (21) to the outlet opening (20) of one of the metering vessels.

4. Apparatus as claimed in claim 1 further characterized in that each metering vessel is suspended at a scale assembly (26,27).

5. Apparatus as claimed in claim 1 further characterized in that the mixing vessel (3) is so supported that it may be tilted downwardly and away from the lid.

6. Apparatus as claimed in claim 1 or 5 further characterized in that the mixing vessel has a displaceable bottom wall supported by an articulated lever (40), and a fluid-operated cylinder (8) for actuating the lever to displace the bottom wall.

7. Apparatus as claimed in claim 1 further characterized by a device which allows the mixing vessel to be supplied with a metered amount of at least one other component, said device being equipped with a counter (31) for measuring the supplied amount of the additional component.

* * * * *